United States Patent [19]

Koon

[11] 4,402,770

[45] Sep. 6, 1983

[54] HARD MAGNETIC ALLOYS OF A TRANSITION METAL AND LANTHANIDE

[75] Inventor: Norman C. Koon, Woodbridge, Va.

[73] Assignee: The United States of America as represented by the Secretary of the Navy, Washington, D.C.

[21] Appl. No.: 314,325

[22] Filed: Oct. 23, 1981

[51] Int. Cl.[3] .............................................. C04B 35/00

[52] U.S. Cl. ................................ 148/31.57; 420/435; 75/123 B; 75/123 E

[58] Field of Search ..................... 75/170, 152, 123 B, 75/123 E, 134 N, 134 F; 148/31.57, 101, 102, 103, 104, 105, 108; 420/435, 416

[56] References Cited

U.S. PATENT DOCUMENTS

| | | | |
|---|---|---|---|
| 3,982,971 | 9/1976 | Yamanaka et al. | 148/31.57 |
| 4,065,330 | 12/1977 | Masumoto et al. | 148/31.55 |
| 4,222,770 | 9/1980 | Osumi et al. | 75/122 |

FOREIGN PATENT DOCUMENTS

| | | |
|---|---|---|
| 5641345 | 4/1918 | Japan . |
| 56-72123 | 6/1981 | Japan . |

OTHER PUBLICATIONS

Metallic Glasses, American Society for Metals 1978, pp. 6–9 and 31.

*Primary Examiner*—John P. Sheehan
*Attorney, Agent, or Firm*—Robert F. Beers; William T. Ellis; Thomas E. McDonnell

[57] ABSTRACT

A hard magnetic alloy comprises iron, boron, lanthanum, and a lanthanide and is prepared by heating the corresponding amorphous alloy to a temperature from about 850 to 1200 K. in an inert atmosphere until a polycrystalline multiphase alloy with an average grain size not exceeding 400 Å is formed.

22 Claims, 2 Drawing Figures

HARD MAGNETIC ALLOYS OF A TRANSITION METAL AND LANTHANIDE

BACKGROUND OF THE INVENTION

The present invention pertains generally to hard magnetic alloys and in particular to hard magnetic alloys comprising iron, boron, and lanthanides.

Iron alloys, including iron-boron alloys, have been used extensively as magnets, both soft and hard. A hard magnetic alloy is one with a high coercive force and remanence, whereas a soft magnetic alloy is one with a minimum coercive force and minimum area enclosed by the hysteresis curve.

Permanent magnets are generally made from hard magnetic materials because a large magnetic moment can exist in the absence of an applied magnetic field. Presently a wide variety of hard magnetic materials are known; however, all of them exhibit specific characteristics which render them suitable for some application but not for others.

The highest-performance permanent magnets are made from rare-earth, transition-metal, inter-metallic compounds such as $SmCo_5$ or alloys closely related to it. Examples of these alloys are disclosed in U.S. Pat. No. 3,558,372. These alloys have magnetic properties which are extremely good for almost every application. The disadvantages are that they contain very expensive elements. They contain 34 percent rare earth by weight, and cobalt is a very expensive transition metal, currently in short supply. A second problem is that to get maximum performance, alloy processing of a rare earth permanent magnet is very complicated. Many of the techniques to get such performance are proprietary and not generally disseminated. A third problem is that high coercive forces are only available for a limited range of compositions, which means that the ability to change characteristics such as saturation magnetization are also limited.

Magnets which do not contain rare earths generally have much lower coercive forces than those of $SmCo_5$ and related alloys. The various forms of ALNICO, for example, have coercive forces in the range of 600–1400 Oe, which is low for many applications. ALNICO alloys also contain a large amount of cobalt, which is expensive and in short supply. The advantage of ALNICO alloys is that they do have large values of saturation magnetization.

There are other permanent magnet materials often used. Various kinds of ferrites are available very cheaply, but generally they have both low coercive forces and low values of magnetization, so that their main virtue is very low cost. MnAlC alloys have no cobalt or other expensive elements and are beginning to be used. There again the coercive force and performance are lower than the $SmCo_5$ class of alloys, although the cost is also lower. Cobalt-iron alloys including an addition of nickel, such as, U.S. Pat. Nos. 1,743,309 and 2,596,705 have hard magnetic properties, but generally do not have a large magnetic hysteresis.

SUMMARY OF THE INVENTION

It is, therefore, an object of this invention to prepare large quanties of permanent magnets easily and relatively inexpensively.

Another object is to prepare permanent magnets with a wide range of magnetic characteristics.

Another object of this invention is to prepare permanent magnets with a high coercive force.

And another object is to prepare isotropic permanent magnets having moderately high magnetization.

A further object of this invention is to prepare a permanent magnet with a wide range of permeability.

These and other objects are achieved by heating an amorphous alloy comprising iron, boron, lanthanum, and a lanthanide until a polycrystalline mutli-phase alloy with a grain size small enough to be a single-domain particle is formed.

DETAILED DESCRIPTION OF THE INVENTION

Figure 1:
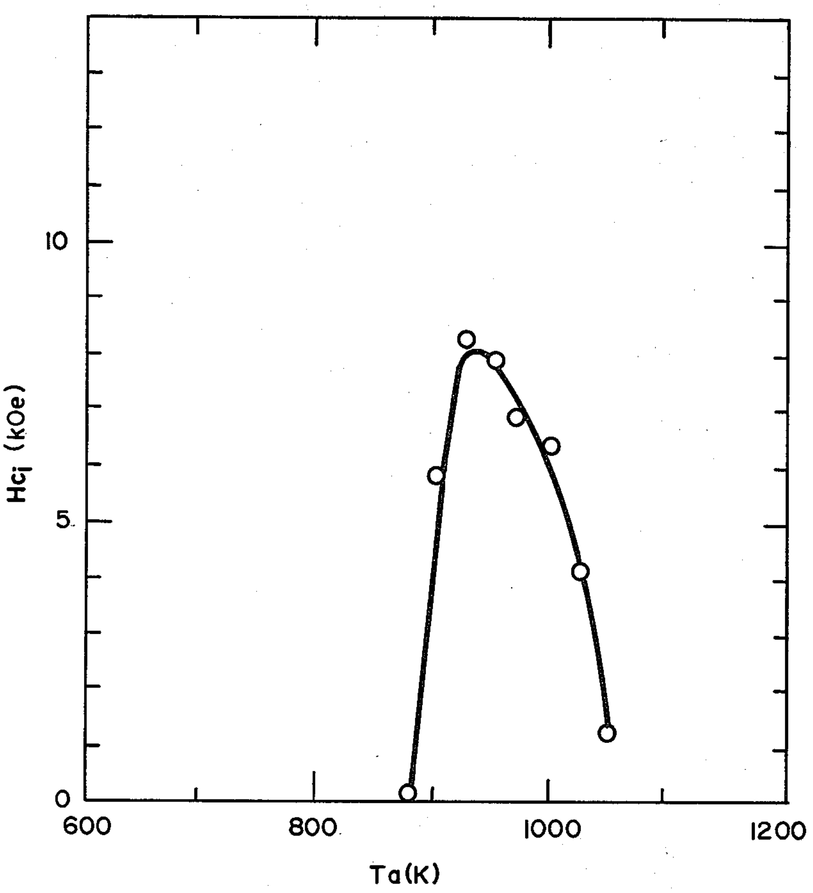
FIG. 1 shows the intrinsic coercive force of $(Fe_{0.82}B_{0.18})_{0.9}Tb_{0.05}La_{0.05}$ at 300 K. following a series of one-hour anneals at 25 K. temperature intervals.

The polycrystalline single-domain alloys of this invention are represented by the formula: $(M_wX_xB_{1-w-x})_{1-y}(R_zLa_{1-z})_y$ wherein w is from about 0.7 to about 0.90; x is from 0 to about 0.05; y is from about 0.05 to about 0.15; z is from 0 to about 0.95; M is selected from the class consisting of iron, cobalt, an iron-cobalt alloy, an iron-manganese alloy having at least 50 atomic percent iron, and an iron-cobalt-manganese alloy having at least 50 atomic percent iron and cobalt, X is a glass former selected from the class consisting of phosphorous, arsenic, germanium, gallium, indium, antimony, bismuth, tin, carbon, silicon, and aluminum; and R is a lanthanide.

Lanthanum must be present because it is needed to obtain amorphous alloys of iron, boron, and lanthanides from which the polycrystalline alloys of this invention are prepared. Any lanthanide can be used, but many have poor magnetic properties, are expensive, or are difficult to process. These nonpreferred lanthanides are cerium, praseodymium, neodymium, europium gadolinium, ytterbium, and lutetium. An iron-boron alloy with only lanthanum is not preferred as a hard magnet because of poor magnetic properties. The most preferred lanthanides are terbium, dysprosium, holmium and erbium. It is possible to alloy iron and boron with the lighter lanthanides (Ce, Pr, Nd) in concentrations of less than two atomic percent.

The amount of the lanthanide (R) relative to the amount of lanthanum is from 0 to about 0.95. Since the advantageous properties arise from the inclusion of a lanthanides (R) other than lanthanum, an amount less than 0.3 for the lanthanide is not preferred. On the other hand, an amorphous alloy is generally not obtainable without lanthanum; so, alloys with a lanthanide in excess of 0.75 would be difficult to prepare. These alloys would require a large amount of an auxiliary glass former, a higher amount of boron, and careful processing in order to obtain an amorphous microstructure. The most preferred range for the lanthanide is from 0.4 to 0.75.

Iron is the preferred metal for M. Other elements and alloys can also be used, such as cobalt, iron-cobalt alloys, and iron-manganese alloys. The preferred amount of cobalt and iron is from 0.72 to 0.86 and most preferably 0.78 to 0.84. The alloys are represented as:

(1) $Fe_aCo_{1-a}$ wherein a is from about 0.01 to about 0.99; and preferably from 0.7 to 0.95;

(2) $Fe_bMn_{1-b}$ wherein b is greater than 0.5 but less than 1.0 and preferably is greater than 0.7 but less than or equal to 0.95;

(3) $Fe_dCo_eMn_{1-d-e}$ wherein (d+e) is from about 0.5 to less than about 1.0 and preferably from 0.75 to 0.95 and d is greater than e and preferably is more than two times greater than e.

The auxillary glass formers increase the amount of lanthanide which can be included without eliminating the amorphous microstructure. The most common glass formers phosphorous, silicon, arsenic, germanium, aluminum, indium, antimony, bismuth, tin, and mixtures thereof. The preferred auxillary glass formers are phosphorus, silicon, and aluminum. The preferred amount of glass former which can be added is from about 0 to about 0.03.

The amount of lanthanum, and lanthanide is from about 0.05 to about 0.15 of the total alloy and preferably is from 0.05 to 0.10. It is possible to form alloys with a lanthanum-lanthanide amount greater than 0.15, depending on the lanthanide, the relative amounts of iron and boron, the presence of a glass former, and the processing parameters. The upper limit of 0.15 represents a general limit, which assures the preparation of an amorphous alloy.

All amounts of the constituents are expressed in atomic concentrations of that constituent and not of the alloy. Only the expression (y) represents a portion of the total alloy. For an alloy having M representing $Fe_{0.5}Co_{0.3}Mn_{0.2}$ w equaling 0.7, x equaling 0, R representing neodymium, z equaling 0.5, and y equaling 0.1, than formula for the alloy would be $((Fe_{0.5}Co_{0.3}Mn_{0.2})_{0.7}B_{0.3})_{0.9}(Nd_{0.5}La_{0.5})_{0.1}$.

The amorphous alloys from which the polycrystalline alloys are prepared can be prepared by rapidly cooling a melt having the desired composition. A cooling rate of at least about $5\times10^4$ C./sec. and preferably at least $1\times10^6$ C./sec.

Examples of techniques for cooling thin sections include ejecting molten alloy onto a rapidly rotating inert surface, e.g., a highly polished copper wheel, ejecting molten alloy between two counterrotating rollers, vapor deposition or electrolytic deposition on a cold surface. The preferred technique is ejecting the molten alloy onto the surface of a polished, copper wheel rotating at a rate of at least 200 rpm.

The polycrystalline alloys of this invention are prepared from the above amorphous alloys by heating the alloys in an inert atmosphere at a temperature from about 850 to about 1200 K. and preferably from 950 to 1050 K. until the desired microstructure is obtained. The preferred inert atmosphere is a vacuum or argon with or without a getter such as tantalum. The alloys can be cooled at any rate and by any method. Of course, the preferred method is to let the alloy cool to room temperature by removing the heat from the alloy. The maximum average grain size is about 400 A and preferably is from 100 to 200 A.

The alloy is magnetized either by cooling the alloy after preparation in a magnetic field of at least one kOe and preferably of at least three kOe or by applying a magnetic field of at least about 25 kOe and preferably of at least 30 kOe after the alloy is cooled. The length of exposure to the magnetic field depends on the strength of the field and the size of the sample. It can be empirically determined by routine experimentation.

To better illustrate the present invention the following examples are given by way of demonstration and are not meant to limit this disclosure or the claims to follow in any manner.

1. Preparation of Amorphous Alloys

Amorphous alloys, from which the examples were prepared, were prepared by weighing out appropriate amounts of the elemental constituents having a nominal purity of at least 99.9 at %. The constituents were then melted together in an electric arc furnace under an atmosphere of purified Ar. Each ingot was turned and remelted repeatedly to ensure homogeneity.

A portion of each homogenized ingot was placed in a quartz crucible having a diameter of 10–11 mm. and a small orifice at the end of approximate diameter 0.35 mm. The quartz tube was flushed with Ar gas to prevent oxidation during heating. The ingot was then heated to the melting point by an induction furnace, then ejected on to a rapidly rotating copper wheel by raising the Ar pressure to about 8 psi. The copper wheel was ten inches in diameter and rotated at an approximate speed of 2500 RPM. The surface of the wheel was polished by using 600 grit emery paper for the final finish. The resulting ribbons were approximately 1 mm in width and 15 microns in thickness.

The morphous alloys are prepared in the manner described in the inventor's co-pending application filed on Oct. 23, 1981 for Soft Magnetic Alloys and Preparation Thereof which is herein incorporated by reference.

2. Preparation of Polycrystalline Hard Magnetic Alloys

A ribbon (8–10 mg) of one of the amorphous alloys prepared by the previous method was sealed in an evacuated 50 c.c. quartz tube and heated by means of a heating coil to 925 K. in 16 hours in a magnetic field of 1.4 k Oe. Free-standing the quartz tube cooled the sample to room temperature. After cool down the ribbon was taken out for measurement of the intrinsic coercive force 3. Measurement of Intrinsic Coercive Force The coercive force was measured using a vibrating sample magnetometer. The magnetic field was first applied parallel to the spontaneous moment, then raised to 26 k Oe. The moment was then measured as a function of applied field as the field was reduced, then reversed to the maximum field of the magnet, then brought back up again. The intrinsic coercive force is the reverse field required to reduce the magnetization to zero on the initial reversal. The results, along with the alloy composition are summarized in Table I.

TABLE I

| Alloy | Intrinsic Coercive Force (Oe) |
|---|---|
| $(Co_{.74}Fe_{.06}B_{.20})_{.94}Sm_{.01}$ | 930 |
| $(Co_{.74}Fe_{.06}B_{20})_{.95}Sm_{.02}La_{.03}$ | 1120 |
| $(Fe_{.82}B_{.18})_{.95}Tb_{.03}La_{.02}$ | 3000 |
| $(Co_{.74}Fe_{.06}B_{20})_{.94}Sn_{.03}La_{.03}$ | 1670 |
| $(Fe_{.82}B_{.18})_{.9}Tb_{.05}La_{.05}$ | 8500 |
| $(Fe_{.82}B_{.18})_{.9}Sm_{.05}La_{.05}$ | 600 |
| $(Fe_{.85}B_{.15})Tb_{.05}La_{.05}$ | 9400 |
| $(Fe_{.88}B_{.12})Tb_{.05}La_{.05}$ | 9600 |
| $(Fe_{.82}B_{.18})_{.9}Tb_{.06}La_{.04}$ | 8400 |

Samples of polycrystalline hard magnetic alloys were prepared by two other methods.

4. Preparation of Polycrystalline Hard Magnetic Alloy, Demonstrating the Effect of Heating on Intrinsic Coercive Force A ribbon (4–6 mg) of $(Fe_{0.82}B_{0.18})_{0.9}Tb_{0.05}La_{0.05}$ prepared by the previous method was placed inside a partially flattened thin-wall tantalum tube of about 1 mm. diameter. The tantalum tube was folded into a length of about 4 mm. The folded tantalum with the ribbon inside was sealed into one end of an evacuated quartz tube. The purpose of the tantalum was to protect the ribbon from oxidation and prevent a reaction with gases released during heat. The tube was heated to some specific temperature for one hour, then cooled to room temperature in a small magnetic field of about 2 kOe. Upon cooling, the ribbon was tested as before. The ribbon was then heated to a temperature 25 K. higher than before, treated for one hour, then cooled and measured again. This was continued until 1100 K. was reached. The results are presented in FIG. 1. The intrinsic coercive force rises to about 8.5 kOe at an anneal temperature of 925 K., then drops rapidly at higher temperatures. The coercive force depended mainly on the highest anneal temperature rather than the detailed history of the process. For example, a 16 hour anneal at 925 K. gave a magnetization loop essentially the same as the above sample.

Figure 2:
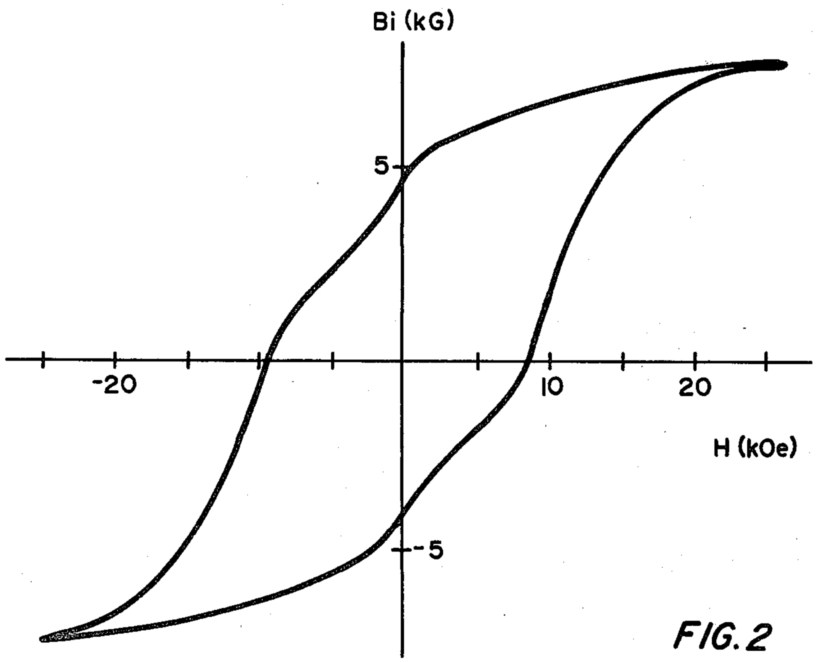
FIG. 2 shows the intrinsic magnetization for crystallized $(Fe_{0.82}B_{0.18})_{0.9}Tb_{0.05}La_{0.05}$ as a function of applied magnetic field.

In FIG. 2 a typical magnetization curve taken at 300 K. on $(Fe_{0.82}B_{0.18})_{0.9}Tb_{0.05}La_{0.05}$ heat treated for 16 hours at 925 K. in a magnetic field of about two kOe is presented. The slight offset in the curve is due to a field cooling effect and disappears upon a few cycles of the field. For this alloy an intrinsic coercive force of 9 kOe, is achieved more or less independent of the details of the anneal. The one hour step anneal procedure, for example, yields an almost identical result when the maximum anneal temperature is 925 K. The shape of the magnetization curve clearly reflects the multi-phase character of the sample. The amount of high coercive force phase varies somewhat from ample to sample and appears to be more sensitive to the Fe/B ratio than to the quenching procedures.

5. Preparation of Polycrystalline Hard Magnetic Alloy By a Fast Anneal At A High Temperature A small ribbon (4–6 mg) of $(Fe_{0.82}B_{0.18})_{0.9}Tb_{0.25}La_{0.05}$ prepared by the previous method, was placed inside a 50 c.c. quartz tube evacuated dynamically by a diffusion pump. The tube was placed in a furnace at 1200 K. for 0.5 to 1.5 minutes. Upon cooling the ribbon was placed in magnetic field 20 kOe for thirty minutes. The intrinsic force was meaured as before. A two-minute anneal at 1200 K. produced an alloy with a lower intrinsic force, indicating that a longer heating at the high temperature causes unfavorable grain growth.

It is clear from these data that the proposed procedure can produce potentially useful coercive behavior from a wide class of rare earth containing amorphous alloys, particularly those with lanthanum, which in a number of cases is required to make the initial alloy amorphous by melt. Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An alloy represented by the formula:

$$(M_wX_xB_{1-w-x})_{1-y}(R_zLa_{1-z})_y$$

wherein w is from about 0.7 to about 0.9; x is from 0 to about 0.05; y is from about 0.05 to about 0.15; z is from 0 to about 0.95; M is selected from the class consisting of iron, cobalt, an iron-cobalt alloy, an iron-manganese alloy having at least 50 atomic percent iron, an iron-cobalt-manganese alloy having at least 50 atomic percent iron and cobalt, X is an auxillary glass former selected from the class consisting of phosphorous, silicon, aluminum, arsenic, germanium, indium, antimony, bismuth, tin, and mixtures thereof, and R is a lanthanide, said alloy having a polycrystalline, multiphase, single-domain-particle microstructure wherein the average crystal-grain size does not exceed 400 A.

2. The alloy of claim 1 wherein M is iron and x is zero.

3. The alloy of claim 2 wherein R is selected from the class consisting of samarium, terbium, dysprosium, holmium, erbium and mixtures thereof and z is from 0.4 to 0.75.

4. The alloy of claim 2 wherein R is selected from the class consisting of terbium, dysprosium, holmium and mixtures thereof and z is from 0.5 to 0.75.

5. The alloy of claim 3 wherein w is from 0.74 to 0.86.

6. The alloy of claim 5 wherein w is from 0.78 to 0.84.

7. The alloy of claim 2 wherein a is from 0.30 to 0.75.

8. The alloy of claim 7 wherein z is from 0.4 to 0.75.

9. The alloy of claim 7 wherein x is 0 and y is from 0.08 to 0.12.

10. The alloy of claim 1 wherein M is cobalt and R is selected from the class consisting of samarium, terbium, dysprosium, holmium, erbium and mixtures thereof.

11. The alloy of claim 10 wherein w is from 0.72 to 0.86, z is from 0.3 to 0.75, and y is from 0.05 to 0.10.

12. The alloy of claim 11 wherein x is 0.

13. The alloy of claim 1 wherein M represents $Fe_aCo_{1-a}$ and a is from about 0.01 to about 0.99.

14. The alloy of claim 13 wherein R is selected from the class consisting of samarium, terbium, dysprosium, holmium, erbium and mixtures thereof and a is from 0.3 to 0.75.

15. The alloy of claim 14 wherein x is zero and R is selected from the class consisting of terbium, dysprosium, holmium, and mixtures thereof.

16. The alloy of claim 1 wherein M represents the formula $Fe_bMn1\text{-}b$ wherein $0.5 \leqq b < 1.0$.

17. The alloy of claim 16 wherein $0.7 \leqq b < 0.95$.

18. The alloy of claim 1 wherein M represents $Fe_dCo_eMn_{1-e}$.

19. The alloy of claim 18 wherein $0.75 \leqq (d+e) \leqq 0.95$ and $d > 2e$.

20. The alloy of claim 18 wherein R is selected from the class consisting of samarium, terbium, dysprosium, holmium, and erbium and x is zero.

21. The alloy of claim 19 wherein R is selected from the class consisting of terbium, dysprosium, holmium, and mixtures thereof and x is zero.

22. The alloy of claims 1, 10, 11, 13, 14, 15, 16, 17, 18, or 19 wherein x is selected from the class consisting of phosphorus, silicon, aluminum, and mixtures thereof.

* * * * *